(12) United States Patent
Evans et al.

(10) Patent No.: US 12,119,021 B1
(45) Date of Patent: Oct. 15, 2024

(54) SITUATIONAL AWARENESS FOR HEAD MOUNTED DEVICES

(71) Applicant: Apple Inc., Cupertino, CA (US)

(72) Inventors: Neal D. Evans, Sunnyvale, CA (US); Robert D. Silfvast, Belmont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/877,865

(22) Filed: May 19, 2020

Related U.S. Application Data

(60) Provisional application No. 62/851,198, filed on May 22, 2019.

(51) Int. Cl.
| | |
|---|---|
| G10L 25/63 | (2013.01) |
| G02B 27/01 | (2006.01) |
| G06F 3/01 | (2006.01) |
| G06F 3/16 | (2006.01) |
| G06V 40/16 | (2022.01) |
| G06V 40/20 | (2022.01) |

(52) U.S. Cl.
CPC .......... G10L 25/63 (2013.01); G02B 27/0172 (2013.01); G06F 3/011 (2013.01); G06F 3/016 (2013.01); G06F 3/167 (2013.01); G06V 40/174 (2022.01); G06V 40/20 (2022.01)

(58) Field of Classification Search
CPC ......... G10L 25/63; G06F 3/167; G06F 3/016; G06F 3/011
See application file for complete search history.

(56) References Cited

U.S. PATENT DOCUMENTS

| | | | |
|---|---|---|---|
| 10,668,930 B1* | 6/2020 | Harvey | ................ G06Q 50/30 |
| 2012/0062444 A1* | 3/2012 | Cok | .................... G02B 27/0172 |
| | | | 345/8 |
| 2015/0223731 A1* | 8/2015 | Sahin | .................. A61B 5/1123 |
| | | | 600/301 |
| 2017/0117005 A1 | 4/2017 | Jerauld | |
| 2018/0124308 A1 | 5/2018 | Andreassen et al. | |
| 2019/0273964 A1* | 9/2019 | Couleaud | ............... H04H 60/46 |
| 2020/0021620 A1* | 1/2020 | Puratheppparambil | ....................... |
| | | | H04L 63/145 |

FOREIGN PATENT DOCUMENTS

WO  WO 2018215827  11/2018

OTHER PUBLICATIONS

Marín-Morales, Javier, et al. "Affective computing in virtual reality: emotion recognition from brain and heartbeat dynamics using wearable sensors." Scientific reports 8.1 (2018): 1-15.*

* cited by examiner

*Primary Examiner* — Weiming He
(74) *Attorney, Agent, or Firm* — Thompson Hine LLP

(57) ABSTRACT

Various implementations disclosed herein include devices, systems, and methods for providing situational awareness for HMD users. Some implementations involve providing a CGR experience to a first user wearing an HMD in a physical environment. Audio data or image data is obtained from a sensor at the physical environment during the CGR experience and an emotional state or direction of attention of a second person other than the first user is detected based on the audio data or image data. A notification or other change is provided in the CGR experience based on detecting the emotional state or direction of attention of the second person.

20 Claims, 7 Drawing Sheets

SITUATIONAL AWARENESS FOR HEAD MOUNTED DEVICES

CROSS-REFERENCE TO RELATED APPLICATIONS

This application claims the benefit of U.S. Provisional Application Ser. No. 62/851,198 filed May 22, 2019, which is incorporated herein in its entirety.

TECHNICAL FIELD

The present disclosure generally relates to electronic devices such as head mounted devices (HMDs), and in particular, to systems, methods, and devices for monitoring the physical environments around users during their Computer Generated Reality (CGR) experiences on electronic devices and selectively providing feedback to those users based on the other people in their physical environments.

BACKGROUND

Users of electronic devices may have reduced or limited awareness of the physical environments around them during CGR experiences on HMDs. For example, CGR content provided by an HMD (or audio playback device) during a CGR experience may replace, obscure, muffle, or otherwise reduce the audio or visual information about the physical environment that the user would otherwise experience outside of the CGR experience. The CGR experience may reduce a user's clues, knowledge, or peripheral information about the user's physical environment. Moreover, the user may make gestures, sounds, movements, or take other actions that bother or otherwise impact other people in the physical environment and the user may be unaware of that impact on those other people. It may be beneficial to provide the user with information based on the other people in the physical environment who may be responding to the user's actions (e.g., rude behavior, distracting gestures, talking too loud, etc.).

SUMMARY

Various implementations disclosed herein include devices, systems, and methods for providing situational awareness for HMDs. As described above, users may make take actions that bother or otherwise impact other people in their physical environments during CGR experiences and the users may be unaware of these impacts because of their reduced awareness of their physical environments. A user's actions may annoy one or more of the other people around the user (e.g., in the physical environment) or draw undue attention to the user. For example, certain actions of the user that may have a high likelihood of annoying other people or drawing undue attention to the user from the other people include but are not limited to: (i) playing audio with external audio speakers at too high a volume (e.g., so that other surrounding people can hear the audio), (ii) vocalizations such as speaking too loudly, laughing, or grunting, or (iii) excessive movement, for example, the user using his or her hands to do too much gesturing or in close proximity to another person.

In various implementations, the HMD has situational awareness (e.g., can detect) of responses of other people in the physical environment around the user and can analyze the emotions or reactions of the other people in the physical environment to determine when the user may be annoying, distracting, or otherwise undesirably impacting them.

In some implementations, an outward facing sensor (e.g., camera(s) or microphone(s)) on an HMD captures images of the other people around the user or captures voices of the other people around the user. In some implementations, an emotional state (e.g., annoyed) of the other people around the user is detected using the audio data or image data. In some implementations, a distracted state of the other people around the user is detected using the image data. In some implementations, the HMD recognizes that the other people around the user are annoyed based on detecting emotions in detected facial expressions or audible utterances of the other people around the user. In some implementations, the HMD determines the distracted attention of the other people around the user based on the facial or body orientation, gestures, gaze, or the like of the other people around the user in one or more images. In some implementations, the HMD may determine or predict that a user's action is likely to be the cause of an emotional state or distracting the attention of one or more other people in the physical environment.

In some implementations, a change in the CGR experience of the user is provided to the user in response to detecting the annoyed emotional state or the unwanted attention of the other people around the user. The change in the CGR experience may provide notice or information to notify a user who may otherwise be unaware that his or her actions are having an effect on other people. In some implementations, the change is a visual or an audio warning "Your behavior may be annoying or distracting others" or the like. Thus, in some implementations, the HMD can supplement or replace the user's reduced awareness of the physical environment during the HMD CGR experience.

In some implementations, the HMD also determines or tracks a context (e.g., location and noise level) of the physical environment around the user (e.g., public or private, train station or library). In some implementations, the HMD applies different thresholds for identifying emotions or distracted states of other people in different contexts.

In some implementations, an HMD having a processor and a sensor implements a method that includes providing a CGR experience to a first user wearing the HMD in a physical environment, and obtaining audio data or image data from the sensor at the physical environment during the CGR experience. In some implementations, an outward facing camera(s) on the HMD captures images of any other people around the first user or a microphone array captures voices of any people around the first user. In some implementations, an emotional state of a second person other than the first user in the physical environment is detected based on the audio data or image data. In some implementations, the method recognizes that the second person is annoyed based on the facial expression, facial orientation, eye/gaze tracking, or gestures of the second person in one or more images or based on audible utterances made by the second person. In some implementations, the method recognizes that the second person is annoyed with the first user. In some implementations, a change in the CGR experience of the first user is provided based on detecting the emotional state of the second person. In some implementations, the change is a visual or an audio warning such as "User behavior may be annoying others," or the like.

In some implementations, an HMD having a processor and a sensor implements a method that includes providing a CGR experience to a first user wearing the HMD in a physical environment. In some implementations, image data from the sensor at the physical environment is obtained during the CGR experience. In some implementations, an outward facing camera(s) on the HMD captures images of any other people around the first user. In some implementations, the method determines that a second person is directing attention to (e.g., is looking at or is distracted by) the first user based on the image data (e.g., based on facial orientation, gaze direction, body orientation/gestures of the second person in one or more images). In some implementations, the method provides a change in the CGR experience of the first user based on determining that the second person is directing attention to the first user. In some implementations, the change is a visual or an audio warning such as "User behavior may be attracting undue attention of others," or the like.

In accordance with some implementations, a non-transitory computer readable storage medium has stored therein instructions that are computer-executable to perform or cause performance of any of the methods described herein. In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
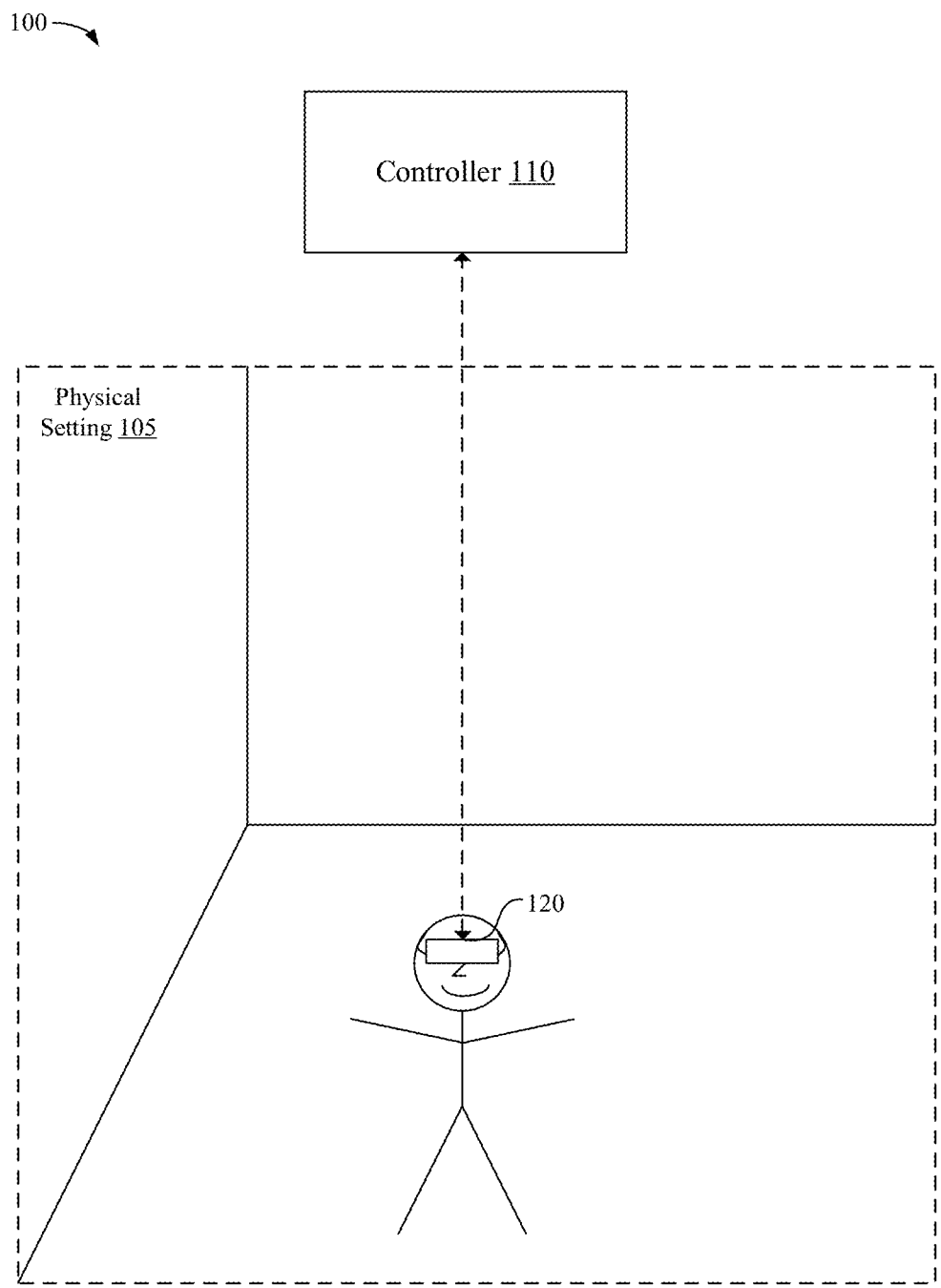
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Figure 2:
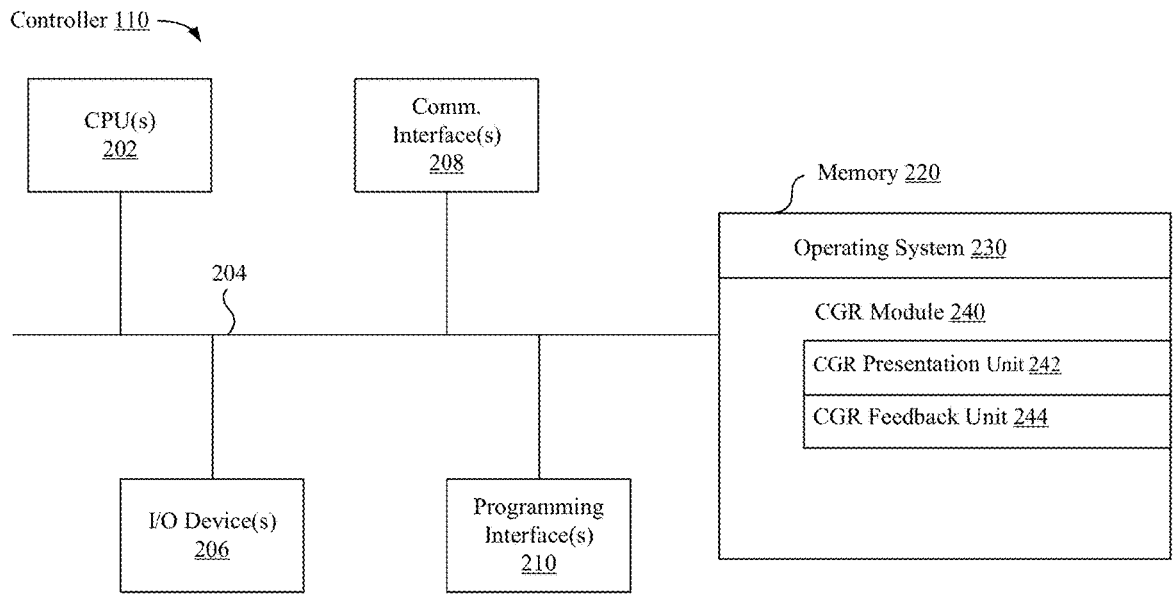
FIG. 2 is a block diagram of an example controller in accordance with some implementations.
Figure 3:
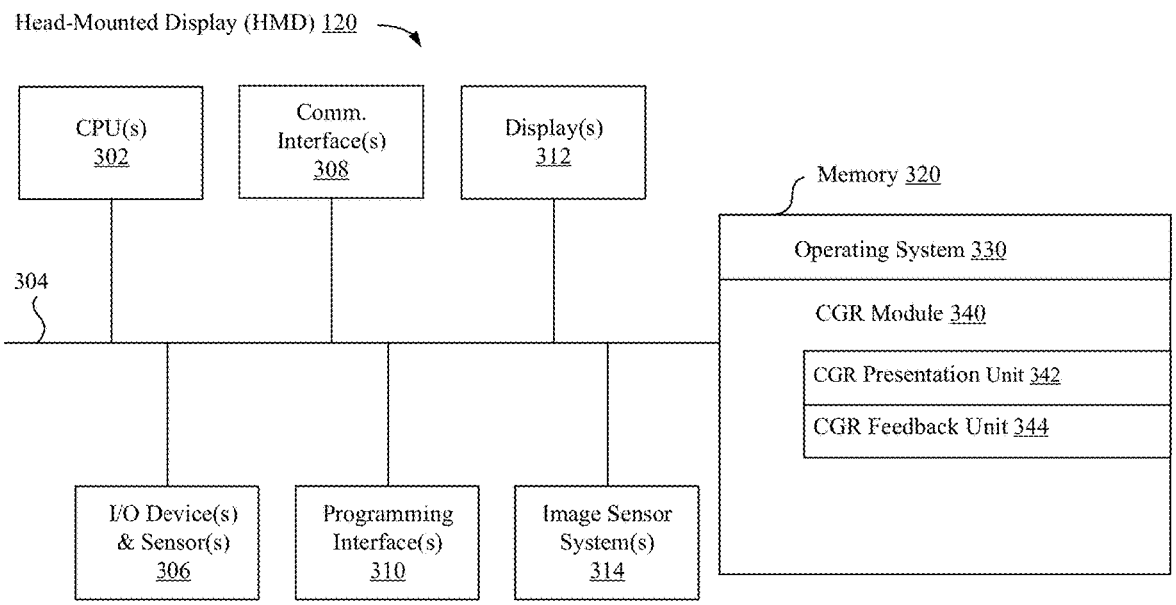
FIG. 3 is a block diagram of an example head-mounted device (HMD) in accordance with some implementations.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein. While FIGS. 1-3 depict exemplary implementations involving a head mounted device (HMD), other implementations do not necessarily involve an HMD and may involve other types of devices including, but not limited to, watches and other wearable electronic devices, mobile devices, laptops, desktops, gaming devices, home automation devices, and other devices that include or use image capture devices.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and a head-mounted device (HMD) 120, one or both of which may be in a physical environment. A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In some implementations, the controller 110 is configured to manage and coordinate a computer-generated reality (CGR) experience for the user. In some implementations, the controller 110 includes a suitable combination of software, firmware, or hardware. The controller 110 is described in greater detail below with respect to FIG. 2. In some implementations, the controller 110 is a computing device that is local or remote relative to the physical environment 105.

In one example, the controller 110 is a local server located within the physical environment 105. In another example, the controller 110 is a remote server located outside of the physical environment 105 (e.g., a cloud server, central server, etc.). In some implementations, the controller 110 is communicatively coupled with the HMD 120 via one or more wired or wireless communication channels 144 (e.g., BLUETOOTH, IEEE 802.11x, IEEE 802.16x, IEEE 802.3x, etc.).

In some implementations, the controller 110 and the HMD 120 are configured to present the CGR experience to the user together.

In some implementations, the HMD 120 is configured to present the CGR experience to the user. In some implementations, the HMD 120 includes a suitable combination of software, firmware, or hardware. The HMD 120 is described in greater detail below with respect to FIG. 3. In some implementations, the functionalities of the controller 110 are provided by or combined with the HMD 120, for example, in the case of an HMD that functions as a stand-alone unit.

According to some implementations, the HMD 120 presents a CGR experience to the user while the user is present within the physical environment 105. A CGR environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image capture devices or other sensors, one or more displays, or the like.

The memory 220 includes high-speed random-access memory, such as dynamic random-access memory (DRAM), static random-access memory (CGRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and computer-generated reality (CGR) module 240.

The operating system 230 includes procedures for handling various basic system services and for performing hardware dependent tasks.

In some implementations, the CGR module 240 is configured to create, edit, present, or experience CGR experiences. In some implementations, the CGR module 240 includes a CGR presentation unit 242 and a CGR feedback unit 244. The CGR presentation unit 242 is configured to present 3D content that will be used as part of CGR experiences for one or more users (e.g., a single CGR experience for one or more users, or multiple CGR experiences for respective groups of one or more users). For example, the user may view and otherwise experience a CGR-based user interface that allows the user to select, place, move, and otherwise present a CGR experience, for example, based on providing input via hand gestures, voice commands, input device inputs, etc. The CGR feedback unit 244 is configured to detect annoyance in people surrounding a CGR experience user or determine undue attention being given to the user from nearby people, and then to provide an audio, haptic, or visual warning thereof (e.g., using a change in the CGR experience).

Although these modules and units are shown as residing on a single device (e.g., the controller 110), it should be understood that in other implementations, any combination of these modules and units may be located in separate computing devices. Moreover, FIG. 2 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

FIG. 3 is a block diagram of an example of the head-mounted device (HMD) 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the HMD 120 includes one or more processing units 302 (e.g., microprocessors, ASICs, FPGAs, GPUs, CPUs, processing cores, or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 310, one or more displays 312, one or more interior or exterior facing image sensor systems 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 312 are configured to present a CGR experience to the user. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), or the like display types. In some implementations, the one or more displays 312 correspond to diffractive, reflective, polarized, holographic, etc. waveguide displays. For example, the HMD 120 includes a single display. In another example, the HMD 120 includes a display for each eye of the user.

The memory 320 includes high-speed random-access memory, such as DRAM, CGRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a CGR module 340.

The operating system 330 includes procedures for handling various basic system services and for performing hardware dependent tasks.

In some implementations, the CGR module 340 is configured to create, edit, present, or experience CGR experiences. In some implementations, the CGR module 340 includes a CGR presentation unit 342 and a CGR feedback unit 344. The CGR presentation unit 342 is configured to present 3D content that will be used as part of CGR experiences for one or more users (e.g., a single CGR experience for one or more users, or multiple CGR experiences for respective groups of one or more users). For example, the user may view and otherwise experience a CGR-based user interface that allows the user to select, place, move, and otherwise present a CGR experience, for example, based on providing input via hand gestures, voice commands, input device inputs, etc. The CGR feedback unit 344 is configured to detect annoyance in people surrounding a CGR experience user or determine undue attention being given to the user from nearby people, and then to provide an audio, haptic, or visual warning thereof (e.g., using a change in the CGR experience). Although these modules and units are shown as residing on a single device (e.g., the HMD 120), it should be understood that in other implementations, any combination of these modules and units may be located in separate computing devices.

Moreover, FIG. 3 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

Figure 4:
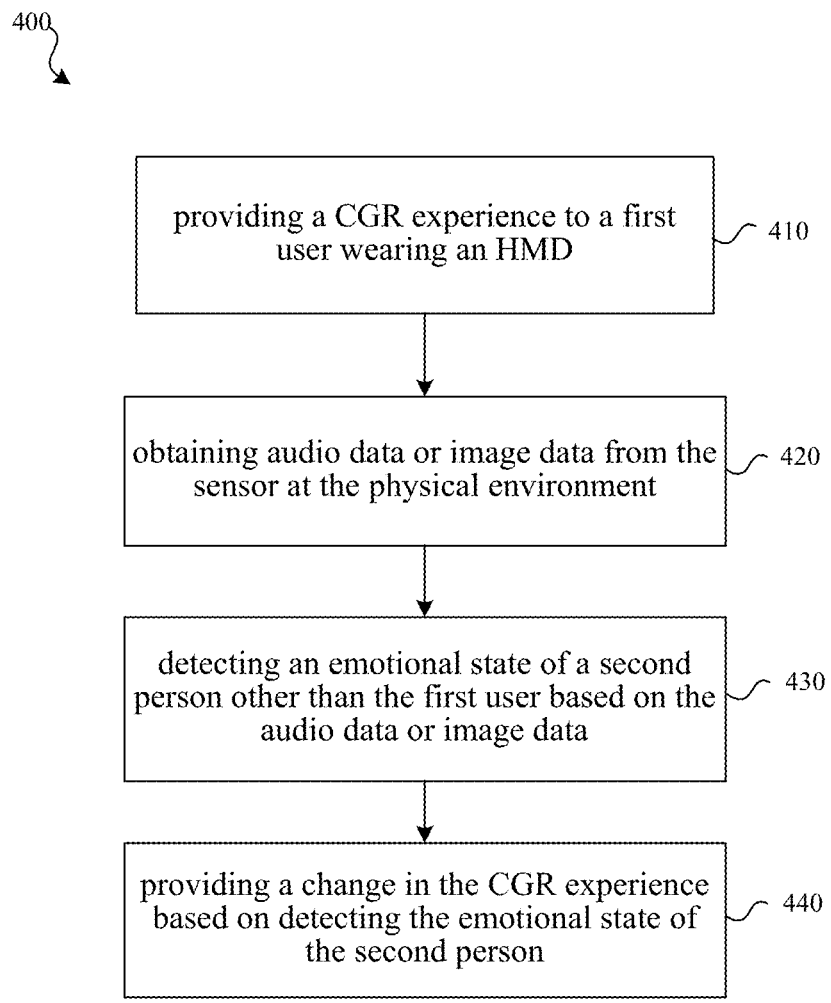
FIG. 4 is a flowchart illustrating an exemplary method of situational awareness for electronic devices according to some implementations.

FIG. 4 is a flowchart illustrating an exemplary method of situational awareness for HMDs according to some implementations. In some implementations, the method 400 is performed by a device (e.g., controller 100 or HMD 120 of FIGS. 1-3). The method 400 can be performed at a mobile device, HMD, desktop, laptop, server device, or by multiple devices in communication with one another. In some implementations, the method 400 is performed by processing logic, including hardware, firmware, software, or a combination thereof. In some implementations, the method 400 is performed by a processor executing code stored in a non-transitory computer-readable medium (e.g., a memory).

At block 410, the method 400 provides a CGR experience to a first user in a physical environment. In some implementations, the CGR experience is presented to the first user on an HMD in the physical environment (e.g., providing real or virtual images and sounds, virtual content, etc.). In some implementations, the CGR experience reduces the ability of the first user to sense or interact with the physical environment. In some implementations, the CGR experience is a VR setting that only includes computer-created sensory inputs for at least one of the senses. In some implementations, the CGR experience includes an application or virtual content that overlays some or all of the physical environment (e.g., displays a picture, an animated avatar, or video (e.g., a video call). In some implementations, an audio playback device (e.g., headphone related to the CGR experience) can replace, obscure, muffle, or reduce the audio information the first user has about the physical environment. In some implementations, the CGR experience captures and uses at least a portion of a live image captured by an image capture device (e.g., a camera) that is part of the device that is performing method 400. For example, a device, such as device 120, may receive images from one or more image capture devices (e.g., image sensor system(s) 314). In some implementations, the image capture device captures a sequence of images (e.g., video frames) some or all of which are to be rendered on a display (e.g., display(s) 312) of the device.

In various implementations, the method may analyze the actions/movements of the user, attributes of the CGR experience, attributes of an audio playback device, or attributes of the physical environment context to identify any user activities or CGR experience attributes having a high probability of disturbing other people around the user (e.g., in the physical environment). In some implementations, the HMD 120 is configured to detect activities that have a high probability of disturbing other people around the first user such as: (i) playing audio too loud with external speakers (e.g., comparison with a threshold or S/N ratio), (ii) vocalizations such as speaking too loudly, laughing, or grunting, for example, like people do on cell phones frequently (e.g., comparison with a threshold or S/N ratio), or (iii) excessive movements, for example, using hands, head, or feet to do too much gesturing (e.g., comparison with a threshold or number of movements within an interval).

At block 420, the method 400 obtains audio data or image data of the physical environment using a sensor of the HMD during the CGR experience. In some implementations, an outward facing image capture device (e.g., a camera or array of cameras) on the HMD captures images of the other people around the user. In some implementations, an outward facing audio capture device (e.g., a microphone or a microphone array) on the HMD captures voices of people around the user. In some implementations, the audio capture device is configured to separate captured audio into two different audio streams, where a first audio stream is audio of the user and a second audio stream is audio of the physical environment (e.g., background audio). In some implementations, an outward facing array of audio or image capture devices can isolate or otherwise identify an individual person or sounds from an individual person of a particular subset of people in the physical environment. In some implementations, images or audio from the outward facing image or audio capture devices are designated for automated processing (e.g., machine viewing and not human viewing) to address privacy concerns. In some implementations, the HMD is configured to specifically use hardware, firmware, or software to prevent image data or audio data from being stored, forwarded, or otherwise used by the first user or the HMD except for the specific purpose of bringing awareness to the first user as described herein.

In some implementations, an outward facing sensor on the HMD captures or analyzes a single image or short sound clip (e.g., a single utterance) of one or more people around the user. In some implementations, the sensor on the HMD captures a series of images or utterances. In some implementations, the series of images or utterances are individually analyzed for content, or alternatively, analyzed for changes in content over time.

At block 430, the method 400 detects an emotional state of a second person other than the first user in the physical environment based on the audio data or image data (e.g., using one or more additional audio capture devices or image capture devices). In some implementations, the method 400 recognizes that the second person is annoyed with the first user based on the facial expression of the second person captured in one or more images. In some implementations, the method 400 recognizes that the second person is annoyed specifically with the first user based on body language or gestures of the second person in one or more images, e.g., based on where the second person is facing or pointing, etc. In some implementations, the method 400 recognizes that the second person is annoyed based on identified emotional content in audible utterances of the second person. In some implementations, the second person is also using an electronic device such as a HMD.

In some implementations, the image data is first analyzed to detect individual people or body parts and then those individual people/parts are analyzed to detect annoyance. For example, in some implementations, the image data is analyzed to first detect faces (e.g., people) in the image data and then the detected faces are analyzed for annoyed emotional expressions (e.g., facial expression recognition). In some implementations, first the faces are detected and then the emotion state is detected in the facial expression. Machine learning (ML) or a ML model may be used to detect individual people/body parts or to analyze them to detect annoyance. In some implementations, a first neural network is trained using many sample images to recognize a human face and a second neural network is trained to recognize emotions in a human facial expressions given a human face as input. In various implementations, the ML model can be, but is not limited to being, a deep neural network (DNN), an encoder/decoder neural network, a convolutional neural network (CNN), or a generative adversarial neural network (GANN). In some implementations, the annoyed emotional state can be detected using eyeball(s) detection and annoyance emotion recognition in the detected eyeball(s) expression. In some implementations, the image data used to detect annoyance is designated for automated processing (e.g., machine viewing and not human viewing) to address privacy concerns.

In some implementations at block 430, the method 400 recognizes that the second person is annoyed with the first user based on audible utterances made by the second person. In some implementations, audible utterances made by the second person that indicate annoyance include specific detected keywords or phrases (e.g., "annoying," "too loud," etc.) or detected expressions of grief or exasperation (e.g., loud sighing—ahhhhhh, tonal changes within an utterance). In some implementations, detecting annoyance include detecting changes in background noise levels or the audible stream of the second person. In some implementations, the annoyed emotional state in detected audible utterances is identified using audible emotional recognition neural networks or ML. In some implementations, the audio data used to detect annoyance is designated for automated processing (e.g., machine analysis and not human analysis) to address privacy concerns.

In some implementations at block 430, the method 400 recognizes that the second person is annoyed with the first user based on facial orientation or gaze direction of the second person captured in one or more images. In some implementations, the facial orientation or gaze direction indicates or identifies annoyance based on repeated occurrences (e.g., repeated eye contact/orientation, frequency of eye contact/orientation) or duration of occurrences (e.g., staring or prolonged repeated eye contact/orientation). In some implementations, the repeated occurrences or prolonged occurrences are measured over preset time intervals.

In some implementations at block 430, the method 400 recognizes that the second person is annoyed with the first user based on the proximity (e.g., distance) between the first user and the second person. In some implementations, the second person is more likely to be sensitive to the first user's actions when the second person is very close to the first user.

In some implementations at block 430, the method 400 recognizes that the second person is annoyed with the first user based on analyzing actions of a plurality of people in the physical environment. For example, the annoyance of a plurality of people in the physical environment could be determined based on a percentage of faces (or body positions) of the plurality of people or a threshold number of faces (or body positions) of the plurality of people oriented to the first user in an image or oriented to the first user within a time interval.

In some implementations at block 430, the method 400 recognizes that the second person is annoyed with the first user based on the CGR experience. For example, the second person is more likely to be disturbed by the first user if the CGR experience is producing audible content output using extra aural speakers.

In some implementations at block 430, the method 400 recognizes that the second person is annoyed with the first user based on actions performed by the first user. These actions can be detected using microphones or cameras of the HMD. For example, the second person is more likely to be disturbed by the first user if the first user is speaking loudly or making loud noises. Loud noises produced by the first user can be detected using the first audio stream produced at block 420. Similarly, the second person is more likely to be disturbed by the first user if the first user is making large gestures or moving erratically.

Detecting annoyance can involve the use of various criteria that account for the actions of one or more other users in the physical environment, the attributes of the physical environment, the actions of the user himself or herself, or the attributes of the CGR experience. In some implementations, the method 400 recognizes that the second person is annoyed based on multiple "hints," or indicators from the image data or audio data. For example, a number or percentage of faces turned and oriented toward the first user within a preset interval (e.g., within the last 10 seconds) may be used to determine that the user behavior is annoying. As another specific example, detecting annoyance may involve determining that actions of other people in the physical environment satisfy predetermined criteria, e.g., detecting annoyance when 30% of the other people within 15 feet of the user in the physical environment have annoyed facial expressions directed towards the user within a 10 second time interval of a loud sound made by the user or the device speakers. In some implementations, multiple "hints," e.g., various combinations of image data and audio data, are weighted to represent importance or relevancy in detecting emotion and combined to generate a cumulative indication of an annoyed emotion of the second person.

At block 440, the method 400 provides a change in the CGR experience of the first user based on detecting the annoyed emotional state of the second person. In various implementations, the change in the CGR experience based on detecting the emotional state of the second person is intended to be a warning or notification to the first user. In some implementations, the notification includes visible text or an audio warning "User behavior may be disturbing others." In some implementations, the notification includes a modification to the HMD display of the first user to attract the attention of the first user. In some implementations, the modification to the HMD display is a visual cue such as allowing the physical environment to be more noticeable to the first user by fading the HMD display, fading out peripheral edges of HMD display, or moving the first user from VR to an AR experience (e.g., move to a partial mixed reality mode thereby allowing the first user to see the surrounding physical environment). In some implementations, the notification includes displaying the disturbed user's face from the analyzed image(s). In various implementations, the change in the CGR experience based on detecting the emotional state of the second person is automatically performed. For example, in some implementations, the volume of the external speakers is automatically lowered.

In some implementations, the method 400 was described with respect to an emotional state of the second person as being annoyed. However, various implementations of systems, methods or devices described herein are not intended to be so limited because other emotional states of the second person may be implemented by the method 400, such as but not limited to, amusement (e.g., laughing), anger, etc.

In some implementations, the method 400 maintains a log of each time the first user triggers an annoyance event (e.g., warning, threshold, etc.) over a period of time, where the first user is able to access or review the log information. In various implementations, any logged data satisfies data privacy protections described herein. In some implementations, use of the logged data for the first user may result in a change in behavior by the first user.

FIGS. 5-8 are block diagrams that show an electronic device (e.g., HMD) capturing a CGR experience of a physical environment according to some implementations.

Figure 5:
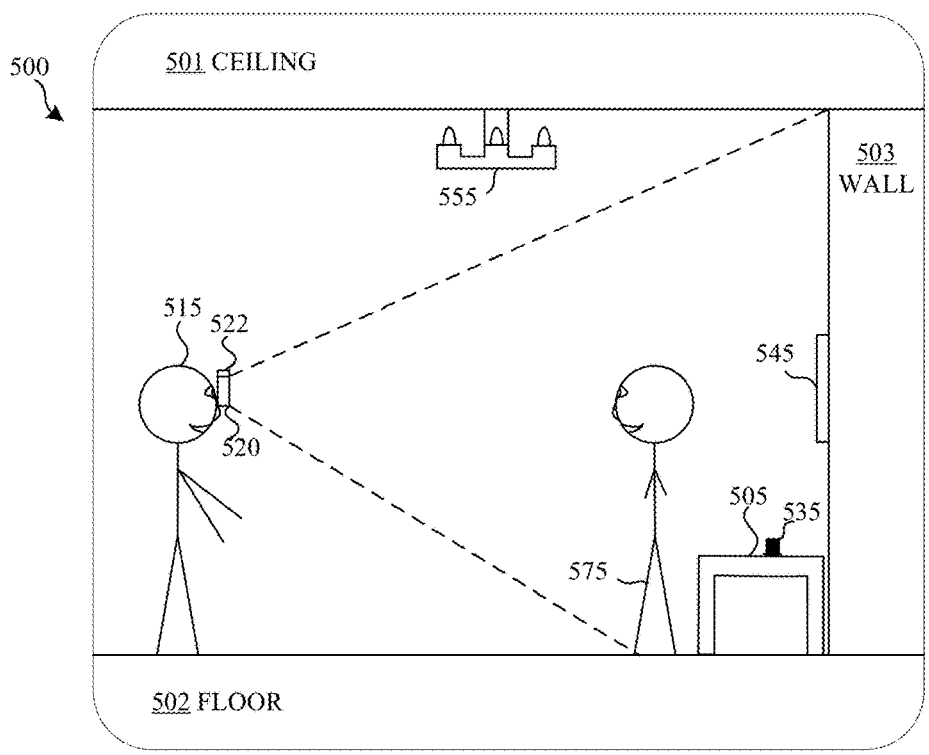
FIG. 5 is a block diagram illustrating a physical environment at a first time during which a device provides a CGR experience to a user according to some implementations.
Figure 6:
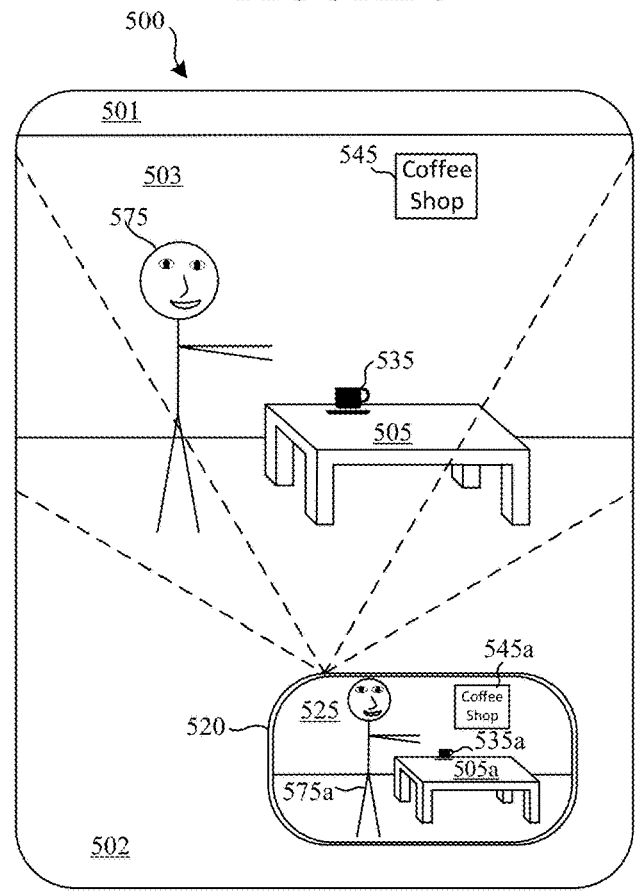
FIG. 6 is a block diagram illustrating another view of the physical environment of FIG. 5.

FIG. 5 is a block diagram illustrating an electronic device 520 providing a CGR experience in a physical environment 500 at a first capture time. In this example, the physical environment 500 includes a second person 575, a ceiling 501, a floor 502, a wall 503, a table 505, a sign 545, and a ceiling light fixture 555. A first user 515 is holding the device 520 and experiencing the CGR experience (e.g., viewing an image 525). FIG. 6 is a block diagram illustrating another view of the device 520 providing the CGR experience 525 at the first capture time illustrated in FIG. 5. In this example, the CGR experience 525 includes a second person depiction 575a of the second person 575, a table depiction 505a of table 505, a coffee cup depiction 535a of a coffee cup 535 on the table depiction 505a, and a sign depiction 545a of sign 545.

In some implementations, the CGR experience 525 is presented to the first user 515 using an HMD as the electronic device 520. In some implementations, the CGR experience 525 reduces the ability of the first user 515 to sense or interact with the physical environment 500. In some implementations, the CGR experience 525 includes an application or virtual object that overlays some or all of the depictions physical environment 500 (e.g., displays a picture, an animated avatar, or video (e.g., video call) related to the caller) when performing function of the application. In some implementations, the CGR experience 525 uses a VR mode that overlays all of the physical environment 500 or an AR mode that overlays some of the physical environment 500.

In various implementations, the HMD 520 analyzes the actions/movements of the user, attributes of the CGR experience, attributes of an audio playback device, or attributes of the physical environment context to identify any user activities or CGR experience attributes having a high probability of annoying or distracting other people around the first user (e.g., in the physical environment). For example, an activity by the first user 515 that is determined to be annoying in a public location (e.g., coffee shop) may be not be determined to be annoying in a private location (e.g., personal residence). Further for example, activity by the first user 515 that is determined to be annoying in a public location such as a library may be not be determined to be annoying in a public location such as a train station. In some implementations, the HMD 520 knows the location of the first user 515 and can appropriately modify criteria by location.

In some implementations, one or more outward facing additional sensors 522 (e.g., image capture device or array (e.g., a camera) captures image data or an audio capture device or array (e.g., microphone) captures audio data of the other people around the first user 515. In some implementations, the audio data includes a first audio data of the first user 515 and second audio data of the physical environment 500. In some implementations, one or more outward facing sensors 522 can zero in on or isolate an individual person of a plurality of people in the physical environment 500.

In alternative implementations, sensors of the device 520 providing the CGR experience 525 can be used to generate the image data or the audio data. In some implementations, a combination of the sensors 522 and the sensors of the device 520 providing the CGR experience 525 generate the image data and the audio data. In some implementations, the HMD 520 uses one or more additional sensors 522 to capture data about the physical environment 500.

In some implementations, the HMD 520 detects an attention or emotional state of the second person 575 in the physical environment based on the audio data or image data from the sensor 522. In some implementations, the HMD 520 recognizes that the second person 575 is annoyed (e.g., emotional state) by the first user 515 based on the facial expression, body language, gestures, etc. of the second person 575 captured in one or more images. In some implementations, the HMD 520 recognizes that the second person 575 is annoyed by the first user 515 based on audible utterances such as specific detected keywords or phrases (e.g., "that is annoying," "too loud," etc.) or detected expressions of grief, exasperation (e.g., loud sighing—ahhhhhh), etc. In some implementations, the HMD 520 recognizes that the second person 575 has his or her attention drawn to (e.g., is looking at) the first user based on the facial orientation, gaze direction, body orientation, gestures, etc. of the second person 575 captured in one or more images of the sensor 522 (e.g., see block 430 or block 930).

In some implementations, the HMD 520 recognizes that a third person (not shown) different from the second person 575 is annoyed or distracted by the first user 515 based on analyzing actions of the third person in the physical environment 500. In some implementations the device 520 recognizes that the first user is being annoying or drawing undue attention by analyzing video data and audio data from the sensor 522 for multiple people in the physical environment 500 around the first user 515.

In some implementations, the HMD 520 recognizes that the second person 575 is annoyed or distracted by the first user 515 based on combining multiple "hints that can be detected in the image data or audio data of the sensor 522 at block 430. For example, annoyance may be detected based on a number of faces of other people oriented toward the first user 515 within a preset time interval following certain actions by the first user 515 or certain CGR experience attributes, e.g., loud volume. In some implementations, multiple indicators in the image data or the audio data are weighted to represent importance or relevancy in detecting annoyance or attention. In some implementations, multiple indicators or weighted indicators in the image data or the audio data are combined to generate a cumulative indication of annoyance or attention of the second person 575.

In some implementations, upon determining that the first user 515 is annoying or drawing undue attention, the HMD 520 provides a warning or notification (e.g., a change in the CGR experience 525) to the first user 515. In some implementations, the notification includes a haptic notification, or visible text or an audio warning "Possible impolite behavior, please check your surroundings" (e.g., see block 440 or block 940).

Figure 7A:
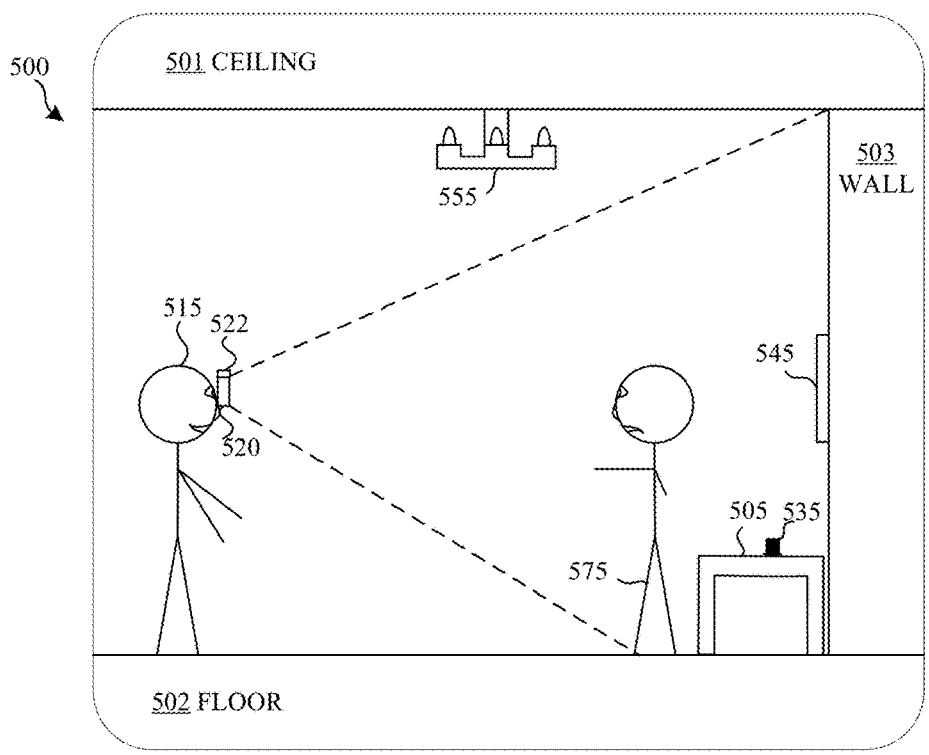
FIG. 7A is a block diagram illustrating the physical environment of FIG. 5 at a second time during which the device continues to provide the CGR experience to the user according to some implementations.
Figure 8A:
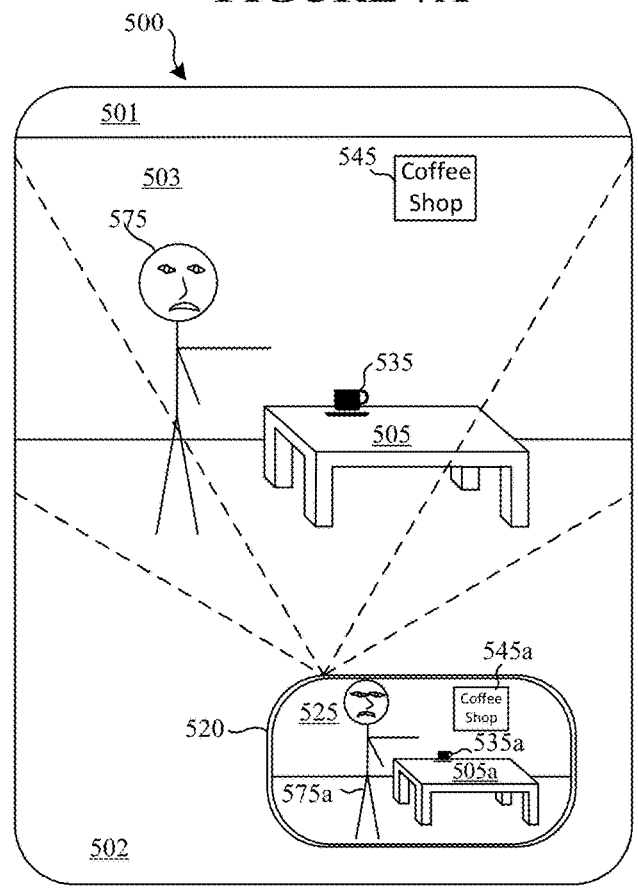
FIG. 8A is a block diagram illustrating another view of the physical environment of FIG. 7A.

FIG. 7A is a block diagram illustrating the HMD 520 of FIG. 5 at a second different time in the physical environment 500 (e.g., a second image capture time). FIG. 8A is a block diagram illustrating another view of the device 520 at the second time illustrated in FIG. 7A. A comparison of FIGS. 5 and 7A reveals that a facial orientation or a facial expression in FIG. 7A of the second person 575 identifies an emotional state of annoyance directed at the first user 515.

Figure 7B:
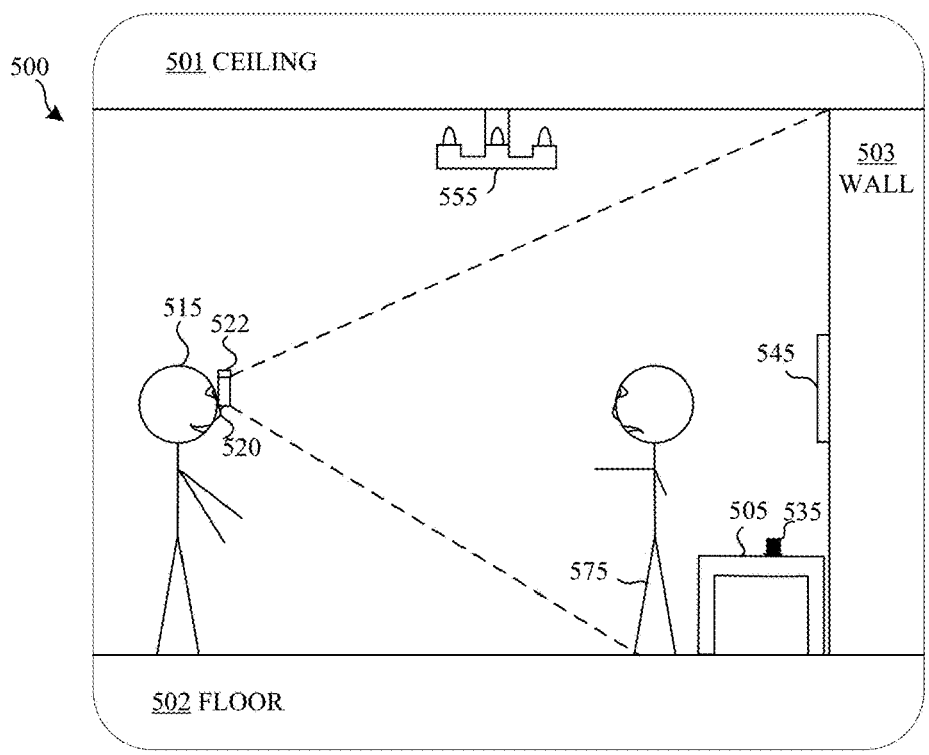
FIG. 7B is a block diagram illustrating the physical environment of FIG. 5 at a third time during which the device continues to provide the CGR experience to the user according to some implementations.
Figure 8B:
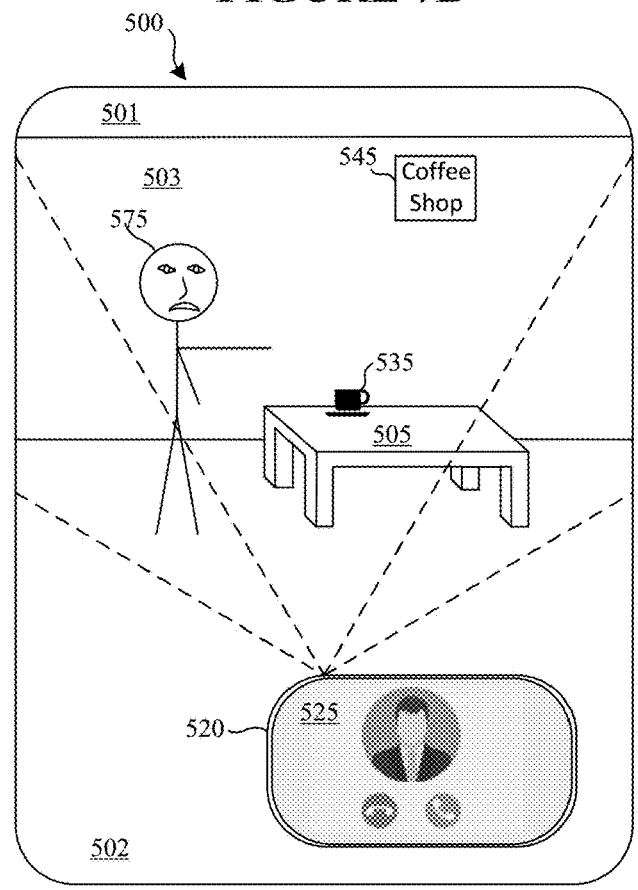
FIG. 8B is a block diagram illustrating another view of the physical environment of FIG. 7B.

FIG. 7B is a block diagram illustrating the HMD 520 of FIG. 5 at a third different time in the physical environment 500 (e.g., a third image capture time). FIG. 8B is a block diagram illustrating another view of the device 520 at the third time illustrated in FIG. 7B. A comparison of FIGS. 5 and 7B reveals that a facial orientation or a facial expression in FIG. 7B of the second person 575 identifies an emotional state of annoyance directed at the first user 515 while the physical environment 500 is partially obscured by an application (e.g., a video call).

In some implementations, upon determining that the first user 515 is annoying or drawing undue attention (e.g., see FIGS. 7A-8B), the HMD device 520 provides a warning or notification to the first user 515. The warning or notification to the first user 515 may result in a change in behavior by the first user 515.

Figure 9:
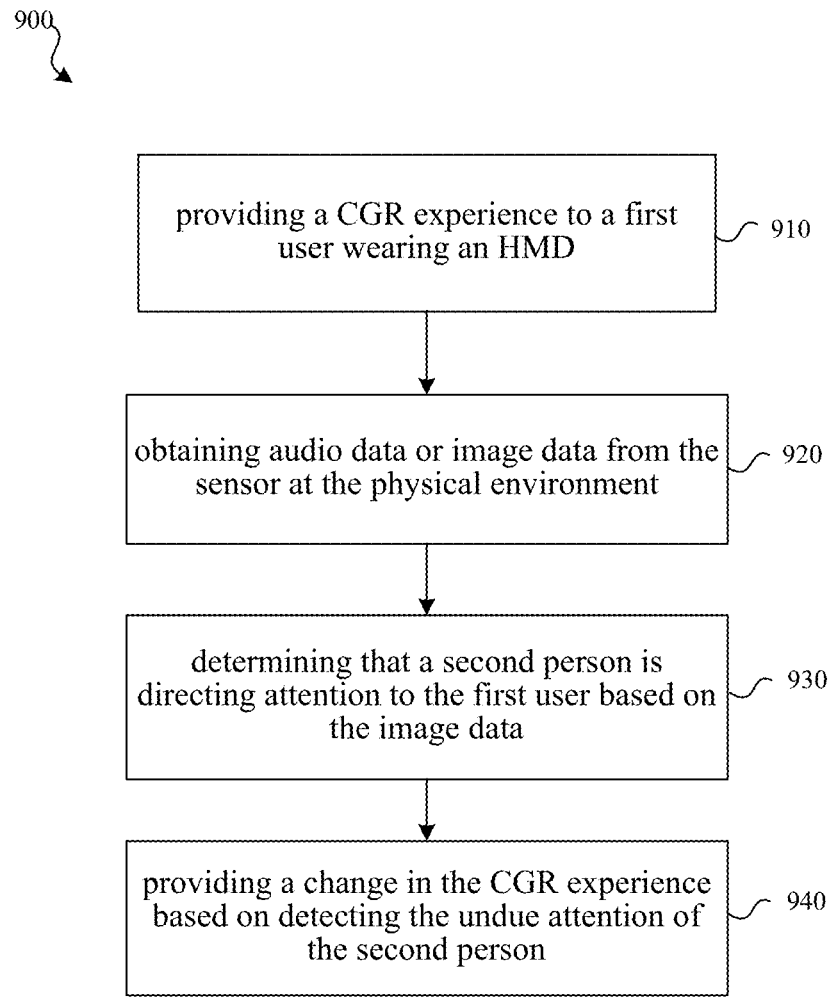
FIG. 9 is a flowchart illustrating an exemplary method of situational awareness for electronic devices according to some implementations.

FIG. 9 is a flowchart illustrating an exemplary method of situational awareness for HMDs. In some implementations, the method 900 is performed by a device (e.g., controller 100 or HMD 120 of FIGS. 1-3). The method 900 can be performed at a mobile device, HMD, desktop, laptop, server device, or by multiple devices in communication with one another. In some implementations, the method 900 is performed by processing logic, including hardware, firmware, software, or a combination thereof. In some implementations, the method 900 is performed by a processor executing code stored in a non-transitory computer-readable medium (e.g., a memory).

At block 910, the method 900 provides a CGR experience to a first user in a physical environment. In some implementations, the CGR experience is presented to the first user on an HMD in the physical environment (e.g., providing real or virtual images and sounds, virtual content, etc.). In some implementations, the CGR experience reduces the ability of the first user to sense or interact with the physical environment. In some implementations, the CGR experience is a VR setting that only includes computer-created sensory inputs for at least one of the senses. In some implementations, the CGR experience includes an application or virtual content that overlays some or all of the physical environment. In some implementations, the CGR experience includes some or all of live images captured by an image capture device (e.g., a camera) that is part of the device that is performing method 900.

In various implementations, the method may analyze the actions/movements of the user, attributes of the CGR experience, attributes of an audio playback device, or attributes of the physical environment context to identify any user activities or CGR experience attributes having a high probability of attracting the attention of other people around the first user. In some implementations, the HMD 120 is configured to detect activities that have a high probability of distracting other people around the first user such as: (i) playing audio too loud with external speakers, (ii) vocalizations such as speaking too loudly, laughing, or grunting, for example, like people do on cell phones frequently, or (iii) excessive movements, for example, using hands, head, or feet to do too much gesturing.

At block 920, the method 900 obtains image data from a sensor at the physical environment during the CGR experience. In some implementations, the HMD 120, may receive images from one or more additional (e.g., dedicated) image capture devices (e.g., one or more image sensors that face away from the first user).

In some implementations at block 920, an outward facing image capture device (e.g., a camera or array of cameras) on the HMD captures or analyzes images of one or more people around the first user. In some implementations, the HMD captures or analyzes a single image or a series of images of the physical environment including the other people around the first user. In some implementations, content or a change in content over time is analyzed in the single image or the series of images of the physical environment including the other people around the first user. In some implementations, an outward facing array of image capture devices (e.g., a camera or array of cameras) can isolate or otherwise identify images of an individual person of a particular subset of people in the physical environment.

At block 930, the method 900 determines that a second person is directing attention to (e.g., is distracted by) the first user (e.g., the second person is looking at the first user) based on the image data. In some implementations, the method 900 recognizes that first user has drawn the attention of the second person based on the facial orientation of the second person captured in one or more images. In some implementations, the method 900 recognizes that first user has drawn the attention of the second person based on body orientation or gestures (e.g., hand or arm) of the second person in one or more images. In some implementations, the method 900 recognizes that the second person is directing attention specifically to the first user based on body language or gestures of the second person in one or more images, e.g., based on where the second person is facing or pointing, etc.

In some implementations, the image data is first analyzed to detect individual people or body parts and then those individual people/parts are analyzed to determine undue attention. For example, in some implementations, the image data is analyzed to first detect faces (e.g., people) in the image data and then to determine the orientation of the face of the second person. ML may be used to detect individual people or body parts and then those individual people/parts are analyzed to determine undue attention. In some implementations, a first neural network is trained on many sample images to recognize a human body (e.g., or face) and a second neural network is trained to recognize an orientation of the human body (e.g., or face) given a human body as an input. In some implementations, the image data used to detect annoyance is designated for automated processing (e.g., machine viewing and not human viewing) to address privacy concerns.

In some implementations at block 930, the method 900 determines that the second person is directing attention (e.g., looking at) to the first user based on facial orientation or gaze direction of the second person captured in one or more images. In some implementations, the facial orientation or gaze direction indicates or identifies the second person is directing attention to the first user based on repeated occurrences (e.g., repeated eye contact/orientation, frequency of eye contact/orientation) or duration of occurrences (e.g., staring or prolonged repeated eye contact/orientation). In some implementations, the repeated occurrences or prolonged occurrences are measured over preset time intervals.

In some implementations at block 930, the method 900 recognizes that the second person is directing attention to the first user based on analyzing actions of a plurality of people in the physical environment. For example, the attention of a plurality of other people could be determined based on a percentage of faces (or body positions) of the plurality of people or a threshold number of faces (or body positions) of the plurality of people are oriented to the first user in an image or become oriented to the first user set time interval. In some implementations at block 930, the method 900 recognizes that a third person different from the second person or the first user is directing attention to the first user based on analyzing actions of the third person in the physical environment.

In some implementations at block 930, the method 900 recognizes that the second person is directing attention to the first user based on the CGR experience. For example, the second person is more likely to be disturbed by the first user if the CGR experience is producing audible content output using extra aural speakers.

In some implementations at block 930, the method 900 recognizes that the second person is directing attention to the first user based on actions performed by the first user. These actions can be detected using microphones or cameras of the HMD. For example, the second person is more likely to be disturbed by the first user if the first user is speaking loudly or making loud noises. Loud noises produced by the first user can be detected using the first audio stream produced at block 420. Similarly, the second person is more likely to be disturbed by the first user if the first user is making large gestures or moving erratically.

Determining undue or distracting attention can involve the use of various criteria that account for the actions of one or more other users in the physical environment, the attributes of the physical environment, the actions of the user himself or herself, or the attributes of the CGR experience. In some implementations, the method 900 recognizes that the second person is directing attention based on multiple "hints," or indicators from the image data. For example, a number or percentage of faces turned and oriented toward the first user within a preset interval (e.g., within the last 2, 5, 10 seconds) may be used to determine that the first user behavior is distracting. In some implementations, multiple "hints" or indicators are weighted to represent importance or relevancy in detecting attention, and then combined to optionally generate a cumulative indication of attention of the second person.

At block 940, the method 900 provides a change in the CGR experience of the first user based on determining that the second person is directing attention to the first user. In various implementations, the change in the CGR experience based on determining the attention of the second person is intended to be a warning or notification to the first user. In some implementations, the notification includes visible text or an audio warning "User behavior may be distracting others." In some implementations, the notification includes a modification to the HMD display of the first user. In some implementations, the modification to the HMD display is a visual cue such as allowing the physical environment to become more noticeable to the first user by fading the HMD display, fading out peripheral edges of HMD display, or moving the first user from VR to AR experience (e.g., move to a partial mixed reality mode thereby allowing the first user to see the surrounding physical environment). In some implementations, the notification includes displaying the second person's face from the analyzed image(s). In some implementations, the change in the CGR experience based on determining that the second person is directing attention to (e.g., is looking at) the first user is automatically performed. For example, in some implementations, the volume of the external speakers is automatically lowered.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

In some implementations, a system includes a non-transitory computer-readable storage medium; and one or more processors coupled to the non-transitory computer-readable storage medium, wherein the non-transitory computer-readable storage medium includes program instructions that, when executed on the one or more processors, cause the system to perform exemplary methods disclosed herein. In some implementations, a non-transitory computer-readable storage medium, stores program instructions computer-executable on a computer to perform operations including exemplary methods disclosed herein.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations, but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
    at a head mounted device (HMD) having a processor and at least one sensor:
        providing a computer generated reality (CGR) experience to a first user wearing the HMD in a physical environment;
        obtaining, via the at least one sensor and during the CGR experience, audio data or image data from the physical environment;
        detecting, based on the audio data or image data, an emotional state of a second person, other than the first user, in the physical environment;
        determining that one or more actions of the first user during the CGR experience are a cause of the emotional state of the second person, wherein the determining is based on:
            identifying indicators corresponding to actions of the second person occurring within a threshold amount of time after presentation of an attribute of the CGR experience to the first user, the actions of the second person identified based on the audio data or the image data, the actions of the second person including facial expressions, audible utterances, gazes, gestures, or changes in orientation; and
            based on the indicators, generating a cumulative indication that the one or more actions of the first user are the cause of the emotional state of the second person; and
        providing, based on the detecting and based on the determining, a change in the CGR experience.

2. The method of claim 1, wherein the determining uses a type of the physical environment.

3. The method of claim 1, wherein the detecting of the emotional state of the second person is based on determining a context of the CGR experience.

4. The method of claim 3, wherein the context is based on context factors comprising one or more of:
- a hearing of the first user being fully or partially replaced with virtual content;
- the first user is speaking or otherwise vocalizing;
- the first user is gesturing;
- external speakers of the first user are enabled;
- a particular application in use;
- a type of the physical environment; or
- the second person is located within a distance threshold of the first user.

5. The method of claim 1, wherein the cumulative indication is determined based on weighting the indicators.

6. The method of claim 1, wherein the obtaining, detecting, and providing are part of a process that is activated and deactivated based on:
- the first user speaking;
- a particular application in use; or
- a type of the physical environment.

7. The method of claim 1, wherein detecting the emotional state of the second person comprises:
- facial expression detection in the image data, and annoyance or anger recognition in a part of the detected facial expression;
- body position detection in the image data, and annoyance or anger recognition in the detected body position; or
- audible expression detection in the audio data and annoyance or anger recognition in a part of the detected audible expression, where the detected audible expression includes words, phrases, expressions of emotion or tone characteristics.

8. The method of claim 1, further comprising identifying that the one or more actions of the first user during the CGR experience satisfies predetermined criteria and occur within the threshold amount of time after presentation of the attribute of the CGR experience.

9. The method of claim 1, further comprising detecting an emotional state for a third person other than the first user and second person in the physical environment based on the audio data or image data and determining that actions of the first user are the cause of the emotional state of the third person.

10. The method of claim 1, wherein providing the change in the CGR experience comprises providing a visual, haptic, or audible notification.

11. The method of claim 1, wherein providing the change in the CGR experience comprises automatically changing from a virtual reality experience to an augmented reality experience.

12. The method of claim 1, wherein the at least one sensor comprises an array of image sensors or an array of audio sensors, and wherein the emotional state of the second person is determined based on audible expression detection in audio data from an audio channel associated with the second person.

13. The method of claim 1, wherein the HMD is configured to prevent the image data or audio data from being stored, forwarded, or otherwise used by the first user or the HMD except for the detecting the emotional state of the second person, the determining that the actions of the first user are the cause of the emotional state of the second person, and the providing, based on the detecting and based on the determining, the change in the CGR experience.

14. The method of claim 1, further comprising maintaining a log of each time the first user triggers an annoyance event according to the detected emotional state of the second person.

15. The method of claim 1, wherein determining that the one or more actions of the first user are the cause of the emotional state of the second person is further based on a number of occurrences of eye contact between the first user and the second person, a duration of the eye contact between the first user and the second person, a proximity of the second person to the first user, or reactions of one or more persons other than the second person.

16. A method comprising:
- at a head mounted device (HMD) having a processor and a sensor:
  - providing a computer generated reality (CGR) experience to a first user wearing the HMD in a physical environment;
  - obtaining, via a sensor and during the CGR experience, image data from the physical environment;
  - determining, based on the image data, that a second person is directing attention to the first user;
  - determining that one or more actions of the first user during the CGR experience are the cause of the second person directing attention to the first user, wherein the determining is based on:
    - identifying indicators corresponding to actions of the second person occurring within a threshold amount of time after presentation of an attribute of the CGR experience to the first user, the actions of the second person identified based on the image data, the actions of the second person including facial expressions, audible utterances, gazes, gestures, or changes in orientation; and
    - based on the indicators, generating a cumulative indication that the one or more actions of the first user are the cause of the second person directing attention to the first user; and
  - providing, based on the determining that the one or more actions of the first user during the CGR experience are the cause of the second person directing the attention to the first user, a change in the CGR experience.

17. The method of claim 16, wherein determining that the second person is directing attention to the first user comprises determining that:
- a head of the second person is oriented to the first user;
- a body of the second person is oriented to the first user;
- a hand of the second person is pointing toward the first user;
- a gaze of the second person is directed to the first user; or
- an arm of the second person is pointing toward the first user.

18. The method of claim 16, wherein the determining that the one or more actions of the first user during the CGR experience are the cause of the second person directing the attention to the first user is further based on a type of physical environment.

19. A system comprising:
- a non-transitory computer-readable storage medium; and
- one or more processors coupled to the non-transitory computer-readable storage medium, wherein the non-transitory computer-readable storage medium comprises program instructions that, when executed on the one or more processors, cause the system to perform operations comprising:

providing a computer generated reality (CGR) experience to a first user in a physical environment;

obtaining, via a sensor and during the CGR experience, audio data or image data from the physical environment;

detecting, based on the audio data or image data, an emotional state of a second person other than the first user in the physical environment;

determining that one or more actions of the first user during the CGR experience are the cause of the emotional state of the second person, wherein the determining is based on:

identifying indicators corresponding to actions of the second person occurring within a threshold amount of time after presentation of an attribute of the CGR experience to the first user, the actions of the second person identified based on the audio data or the image data, the actions of the second person including facial expressions, audible utterances, gazes, gestures, or changes in orientation; and based on the indicators, generating a cumulative indication that the one or more actions of the first user are the cause of the emotional state of the second person; and providing, based on the detecting and based on the determining, a change in the CGR experience.

20. The system of claim 19, wherein the non-transitory computer-readable storage medium further comprises program instructions that, when executed on the one or more processors, cause the system to perform operations comprising generating the cumulative indication based on weighting the indicators.

* * * * *